US009153207B2

(12) United States Patent
Shan et al.

(10) Patent No.: US 9,153,207 B2
(45) Date of Patent: Oct. 6, 2015

(54) UTILIZING SCROLLING DETECTION FOR SCREEN CONTENT ENCODING

(75) Inventors: Sawyer Shan, Hefei (CN); Jeffrey Lai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 783 days.

(21) Appl. No.: 13/430,827

(22) Filed: Mar. 27, 2012

(65) Prior Publication Data

US 2013/0117662 A1 May 9, 2013

Related U.S. Application Data

(60) Provisional application No. 61/555,069, filed on Nov. 3, 2011.

(51) Int. Cl.
*G06F 17/20* (2006.01)
*G09G 5/34* (2006.01)

(52) U.S. Cl.
CPC ............ *G09G 5/34* (2013.01); *G09G 2320/106* (2013.01); *G09G 2340/02* (2013.01); *G09G 2340/16* (2013.01)

(58) Field of Classification Search
CPC ............. G06F 3/1415; H04N 21/4788; G09G 2320/106; G09G 2340/02; G09G 2340/16; G09G 5/34
USPC .......... 345/684; 375/240.01–240.29; 715/243
See application file for complete search history.

(56) References Cited

U.S. PATENT DOCUMENTS 5,689,639 A * 11/1997 Schwarz .......................... 710/73
6,266,369 B1 * 7/2001 Wang et al. ................... 375/240
6,417,888 B1 7/2002 Dunn et al.
7,224,731 B2 * 5/2007 Mehrotra ................. 375/240.16
2003/0179951 A1 * 9/2003 Christiansen ................. 382/278
2004/0101047 A1 * 5/2004 Yang ........................ 375/240.08
2008/0170619 A1 7/2008 Landau
2010/0104021 A1 * 4/2010 Schmit ..................... 375/240.24

* cited by examiner

*Primary Examiner* — Mohammed Rahaman
(74) *Attorney, Agent, or Firm* — Edell, Shapiro & Finnan, LLC

(57) ABSTRACT

A method, a device and computer readable storage media facilitate detecting a scrolling area within digital content comprising a plurality of frames, wherein the detection includes a comparison between a current frame and a previous frame to determine at least one location within the current frame in which pixel values change in relation to a corresponding location of the reference frame, searching for a reference line of pixels within the scrolling area of the previous frame, in response to finding a reference line, searching for a corresponding matching line of pixels in the current frame that matches the reference line, and, in response to finding a corresponding matching line of pixels in the current frame, determining a degree of scrolling of content in the scrolling area of the current frame in relation to the previous frame.

18 Claims, 5 Drawing Sheets

UTILIZING SCROLLING DETECTION FOR SCREEN CONTENT ENCODING

CROSS REFERENCE TO RELATED APPLICATIONS

This application claims priority from U.S. Provisional Application 61/555,069, entitled "Scrolling Detection Method for Screen Content Video Coding", and filed Nov. 3, 2011, the disclosure of which is incorporated herein by reference in its entirety.

TECHNICAL FIELD

The present disclosure relates to desktop sharing of content and encoding of such shared content prior to transmission.

BACKGROUND

Desktop sharing has become an important feature in current collaboration software. It allows virtual meeting attendees to be viewing the same material or content (video, documents, etc.) during a discussion. To make desktop sharing possible, the screen content that is being shared by the sending computing device during a collaboration session must be continuously captured, encoded, transmitted, and finally rendered at receiving computing devices for display.

Traditional desktop sharing applications have compressed screen content into H.264 standard video bitstreams. The screen content being shared is typically treated as ordinary camera captured video, where frames are encoded utilizing intra-frame and inter-frame encoding techniques. An intra-frame encoding technique utilizes pixel blocks from the same frame to encode the frame, whereas inter-frame encoding compares a current frame with one of more neighboring frames and uses motion vectors for encoding. Motion vectors are pointers pointing at the positions of the matching block in the reference frame. The process of finding motion vectors is known as motion estimation. By finding matching blocks of pixels between a current frame and a previous/reference frame, redundancies in encoding of such blocks can be avoided, since encoded blocks of pixels in one frame can be used as a reference for the same block of pixels in other frames, thus minimizing the coding and decoding of content that is required.

Existing desktop sharing applications that adopt H.264 video coding typically rely on motion estimation to enhance encoding efficiency. A problem with scene detection in desktop sharing applications utilizing inter-frame encoding is that the encoding technique examines the entirety of each frame pixel by pixel, and this process must be repeated for every incoming frame.

DESCRIPTION OF EXAMPLE EMBODIMENTS

Overview

A method, a device and computer readable storage media facilitate detecting a scrolling area within digital content comprising a plurality of frames, wherein the detection includes a comparison between a current frame and a previous frame to determine at least one location within the current frame in which pixel values change in relation to a corresponding location of the reference frame, searching for a reference line of pixels within the scrolling area of the previous frame, in response to finding a reference line, searching for a corresponding matching line of pixels in the current frame that matches the reference line, and, in response to finding a corresponding matching line of pixels in the current frame, determining a degree of scrolling of content in the scrolling area of the current frame in relation to the previous frame. The degree of scrolling comprises information relating to a change in location of the matching line of the current frame in relation to the reference line of the previous frame. In addition, the content can be shared by one computing device with one or more other computing devices during a collaboration session between the computing devices.

EXAMPLE EMBODIMENTS

Screen encoding techniques are described herein for capturing desktop screen content, e.g., for sharing during a collaboration session between two or more computing devices. The screen encoding techniques described herein can utilize any suitable coding format, such as a H.264/MPEG-4 AVC (advanced video coding) format.

Many screen activities associated with desktop sharing content involve vertical page scrolling of a digital document. The detected scrolling information is useful in conducting scene detection, reference picture decision and also motion estimation. Since vertical scrolling is a very common operation in desktop screen content, a scrolling detection method is described herein that enhances and accelerates the screen video coding by providing scrolling information to assist the video encoding process.

Figure 1:
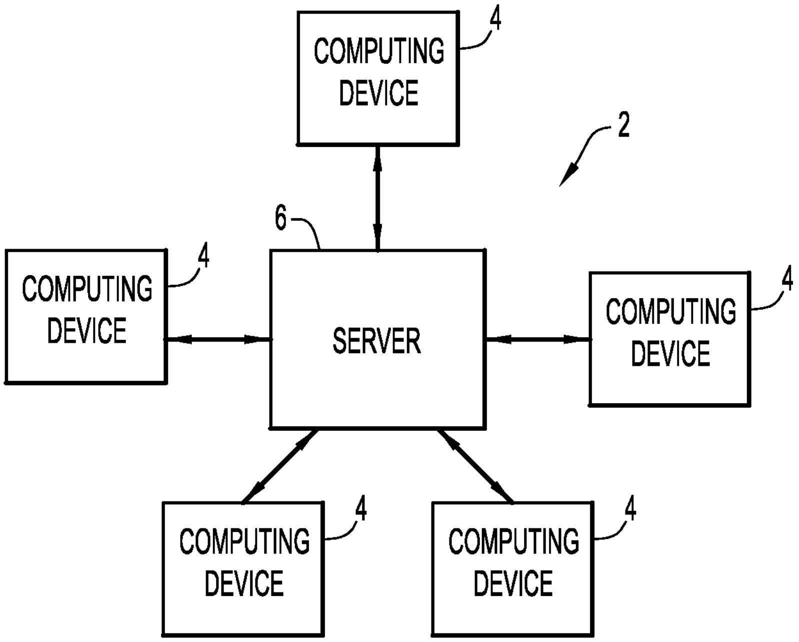
FIG. 1 is a schematic block diagram of an example system in which computing devices are connected to facilitate a collaboration session between the devices including desktop sharing from one device to one or more other devices.

Referring to FIG. 1, a block diagram is shown for an example system that facilitates collaboration sessions between two or more computing devices, where a collaboration session includes desktop sharing of digital content (including scrolling content) displayed by one computing device to other computing devices of the system. A collaboration session can be any suitable communication session (e.g., instant messaging, video conferencing, remote log-in and control of one computing device by another computing device, etc.) in which audio, video, document, screen image and/or any other type of digital content is shared between two or more computing devices. The shared digital content includes desktop sharing, in which a computing device shares its desktop content (e.g., open documents, video content, images and/or any other content that is currently displayed by the computing device sharing the content) with other computing devices in a real-time collaboration session. In other words, desktop sharing during a real-time collaboration session allows other computing devices to receive and display, at substantially the same time (or with a minimal or slight time delay), the same content that is being displayed at the computing device sharing such content. Thus, for example, in a scenario in which one computing device is scrolling through a document, the vertical scrolling of the document (e.g., a text document) by the computing device that is sharing its desktop content will also be displayed by other computing devices that are receiving the shared desktop content during the collaboration session.

The system 2 includes a communication network that facilitates communication and exchange of data and other information between two or more computing devices 4 and a server device 6. The communication network can be any suitable network that facilitates transmission of audio, video and other content (e.g., in data streams) between two or more devices connected with the system network. Examples of types of networks that can be utilized include, without limitation, local or wide area networks, Internet Protocol (IP) networks such as intranet or internet networks, telephone networks (e.g., public switched telephone networks), wireless or mobile phone or cellular networks, and any suitable combinations thereof. While FIG. 1 depicts five computing devices 4 connected with a single server device 6, this is for example purposes only. Any suitable number of computing devices 4 and server devices 6 can be connected within the network of system 2 (e.g., two or more computing devices can communicate via a single server device or any two or more server devices). While the embodiment of FIG. 1 is described in the context of a client/server system, it is noted that content sharing and screen encoding utilizing the techniques described herein are not limited to client/server systems but instead are applicable to any content sharing that can occur between two computing devices (e.g., content sharing directly between two computing devices).

Figure 2:
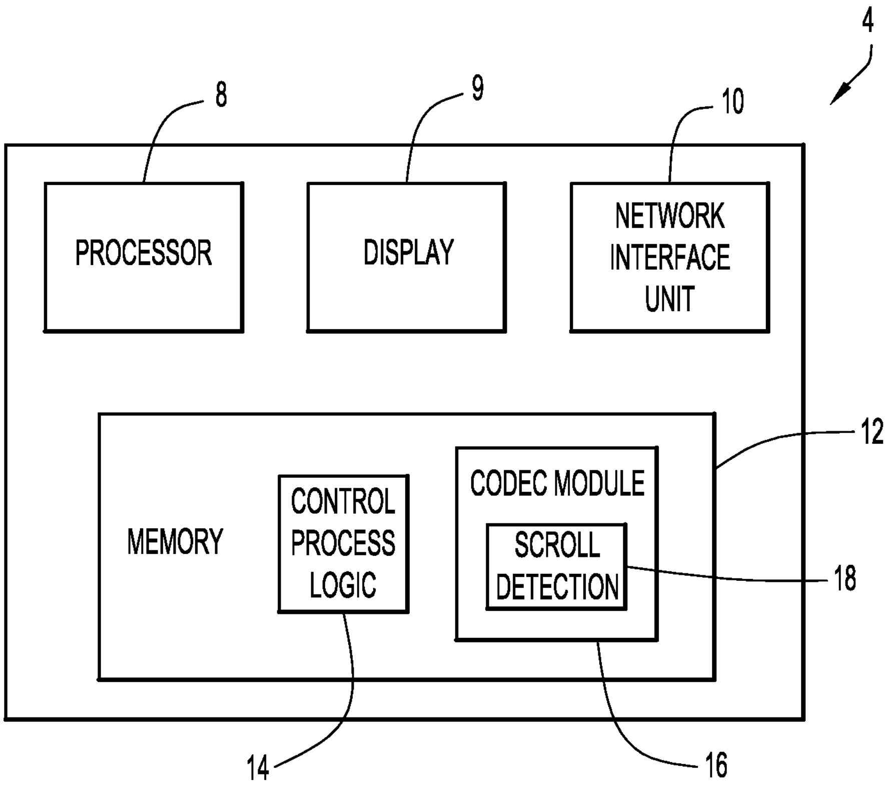
FIG. 2 is a schematic block diagram of an example computing device configured to engage in desktop sharing with other devices utilizing the system of FIG. 1.

A block diagram is depicted in FIG. 2 of an example computing device 4. The device 20 includes a processor 8, a display 9, a network interface unit 10, and memory 12. The network interface unit 10 can be, for example, an Ethernet interface card or switch, a modem, a router or any other suitable hardware device that facilitates a wireless and/or hardwire connection with the system network, where the network interface unit can be integrated within the device or a peripheral that connects with the device. The processor 8 is a microprocessor or microcontroller that executes control process logic instructions 14 (e.g., operational instructions and/or downloadable or other software applications stored in memory 12). The display 9 is any suitable display device (e.g., LCD) associated with the computing device 4 to display video/image content, including desktop sharing content and other content associated with an ongoing collaboration session in which the computing device 4 is engaged.

The memory 12 can include random access memory (RAM) or a combination of RAM and read only memory (ROM), magnetic disk storage media devices, optical storage media devices, flash memory devices, electrical, optical, or other physical/tangible memory storage devices. The processor 8 executes the control process logic instructions 14 stored in memory 12 for controlling each device 4, including the performance of operations as set forth in the flowcharts of FIGS. 3 and 4. In general, the memory 12 may comprise one or more computer readable storage media (e.g., a memory device) encoded with software comprising computer executable instructions and when the software is executed (by the processor 8) it is operable to perform the operations described herein in connection with control process logic instructions 14. In addition, memory 12 includes an encoder/decoder or codec module 16 (e.g., including a hybrid video encoder) that is configured to encode or decode video and/or other data streams in relation to collaboration sessions including desktop sharing in relation to the operations as described herein. The encoding and decoding of video data streams, which includes compression of the data (such that the data can be stored and/or transmitted in smaller size data bit streams) can be in accordance with H.264/MPEG-4 AVC (advanced video coding) or any other suitable format. The codec module 16 includes a scroll detection application 18 that detects vertical scrolling of content by comparison of two or more frames comprising captured screen content as described herein. While the codec module is generally depicted as being part of the memory of the computing device, it is noted that the codec module including scrolling detection can be implemented in one or more application specific integrated circuits (ASICs) that are incorporated with the computing device.

Each server device 6 can include the same or similar components as the computing devices 4 that engage in collaboration sessions. In addition, each server device 6 includes one or more suitable software modules (e.g., stored in memory) that are configured to provide a platform for facilitating a connection and transfer of data between multiple computing devices during a collaboration or other type of communication session. Each server device can also include a codec module for encoding and/or decoding of a data stream including video data and/or other forms of data (e.g., desktop sharing content) being exchanged between two or more computing devices during a collaboration session.

Some examples of types of computing devices that can be used in system 2 include, without limitation, stationary (e.g., desktop) computers, personal mobile computer devices such as laptops, note pads, tablets, personal data assistant (PDA) devices, and other portable media player devices, and cell phones (e.g., smartphones). The computing and server devices can utilize any suitable operating systems (e.g., Android, Windows, Mac OS, Symbian OS, RIM Blackberry OS, Linux, etc.) to facilitate operation, use and interaction of the devices with each other over the system network.

Figure 3:
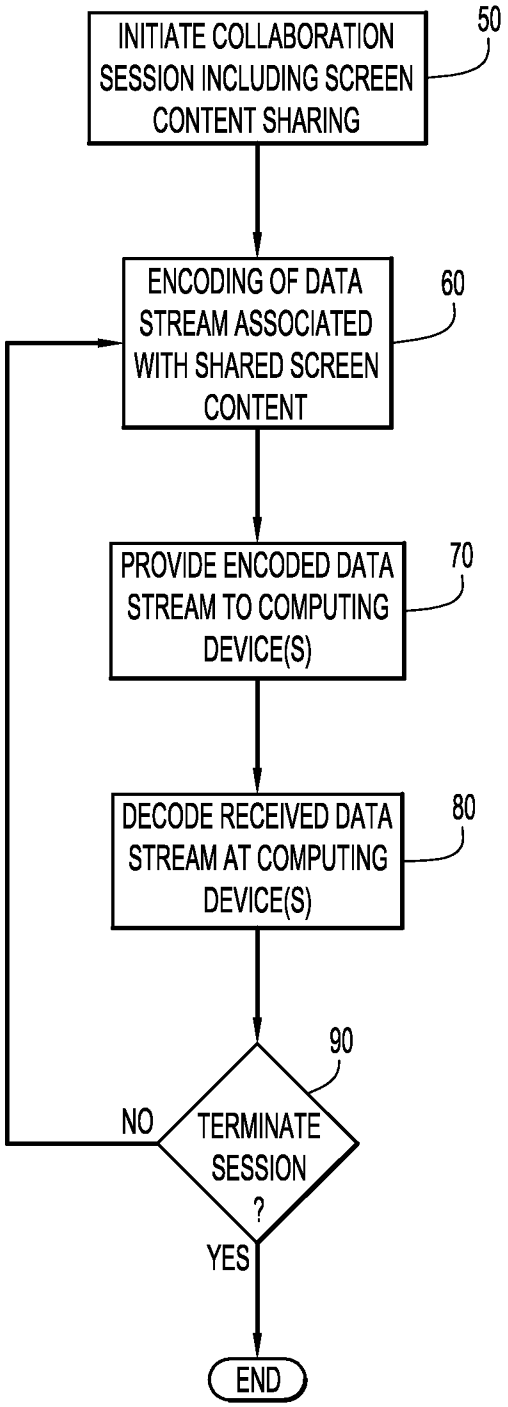
FIG. 3 is a flow chart that depicts an example process for performing a collaboration session between computing devices in accordance with embodiments described herein.
Figure 4:
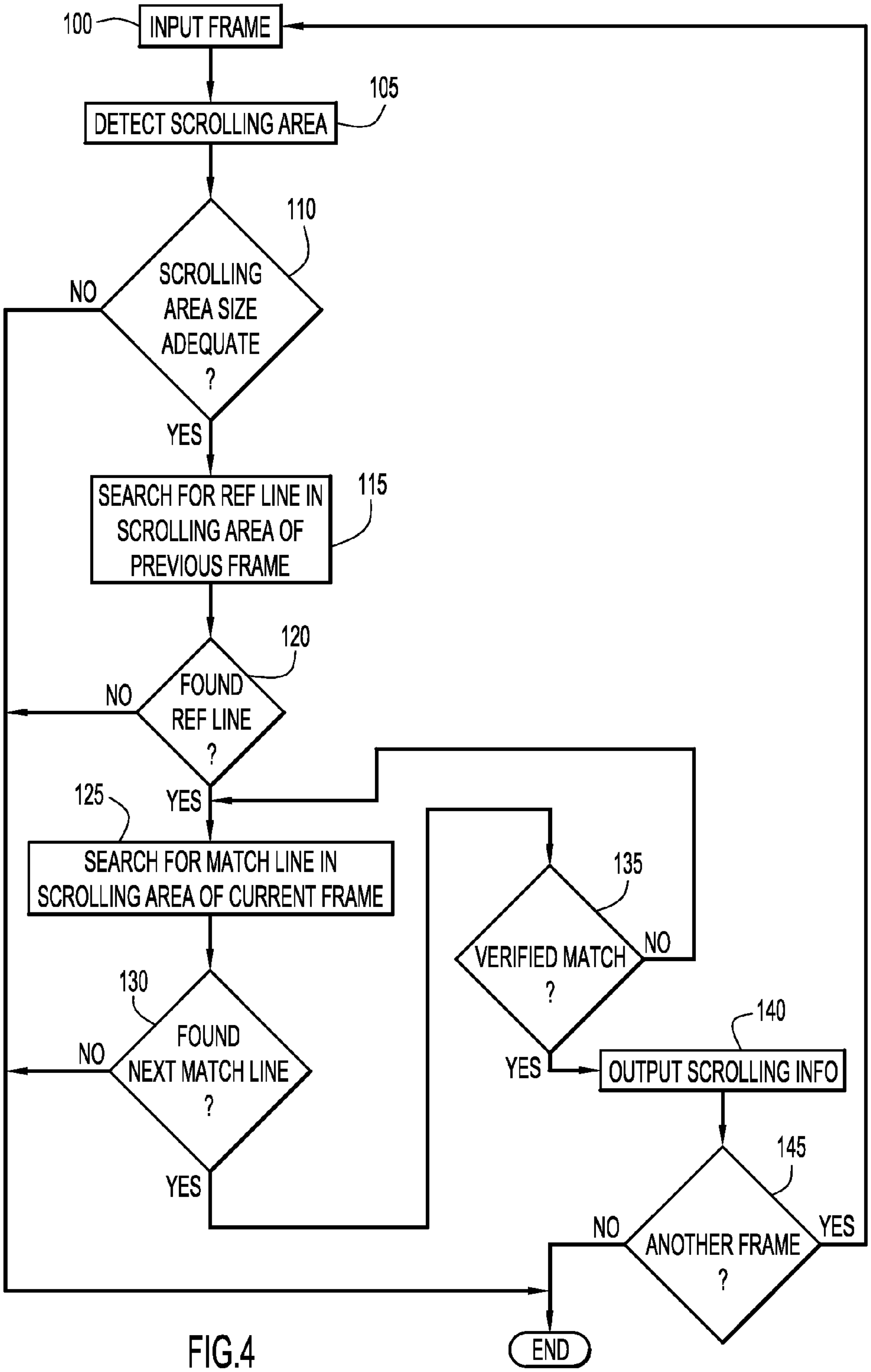
FIG. 4 is a flow chart depicting an example scrolling encoding process for encoding screen content for the process of FIG. 3.

System operation, in which a collaboration session including content sharing (e.g., desktop sharing) is established between two or more computing devices, is now described with reference to the flowcharts of FIGS. 3 and 4. At 50, a collaboration session is initiated between two or more computing devices 4 over the system network, where the collaboration session is facilitated by one or more server device(s) 6. During the collaboration session, a computing device 4 shares its screen or desktop content (e.g., some or all of the screen content that is displayed by the sharing computing device) with other computing devices 4, where the shared content is communicated from the sharing device 4 to other devices 4 via any server device 6 that facilitates the collaboration session. At 60, a data stream associated with the shared screen content, which includes video data, is encoded in accordance with the method depicted in FIG. 4. The data stream to be encoded can be of any selected or predetermined length. For example, when processing a continuous data stream, the data stream can be partitioned into smaller sets, with each set including a selected number of frames that are encoded in accordance with the techniques described herein. The encoding of the data can be performed utilizing the codec module 16 of the desktop sharing computing device 4 and/or a codec module 16 of one or more server devices 6. At 70, the encoded data stream is provided, via the network, to the other computing devices 4 engaged in the collaboration session. Each computing device 4 that receives the encoded data stream utilizes its codec module 16, at 80, to decode the data stream for use by the device 4, including display of the shared screen content via the display 9. The encoding of a data stream (e.g., in sets or portions) for transmission by the sharing device 4 and decoding of such data stream by the receiving device(s) continues until termination of the collaboration session at 90 (or the desktop sharing portion of the collaboration session).

The data encoding that is performed at 60 includes a scrolling detection process, which is implemented utilizing the scroll detection application 18 of codec module 16. The process is described with reference to the flow chart of FIG. 4. The detection of scrolling occurs on a frame-by-frame basis. At 100, a frame is input for analysis by the application 18. At 105, a scrolling area is detected by finding non-static portions within the frame. In particular, the current frame is compared with a previous reference frame (e.g., frame N is compared with frame N−1) to determine which areas or pixel blocks within the current frame are different from the corresponding areas or pixel blocks of the reference frame. Each pixel block can have a coordinate value assigned to it (e.g., an (x,y) coordinate value), such that pixel blocks having the same coordinates but different pixel values for the current and reference frames indicates a non-static portion. The combined pixel blocks that have changed indicate a changing area. For screen sharing content that is capturing a scrolling text document or other document that includes scrolling content, the changes in pixel blocks indicate scrolling areas (e.g., scrolling lines of text) within the frame.

At 110, upon determination of a scrolling area, a determination is made regarding whether the scrolling area is adequate. A predetermined minimum area size threshold is used to implement scrolling detection, since a scrolling area that is too small will not improve coding efficiency by utilizing the scrolling detection method. If the detected scrolling area is adequate (i.e., its size is greater than a minimum threshold), the scrolling detection process continues, where scrolling detection is limited to the detected scrolling area of the current frame. If it is not, the scrolling detection process ends.

Figure 5:
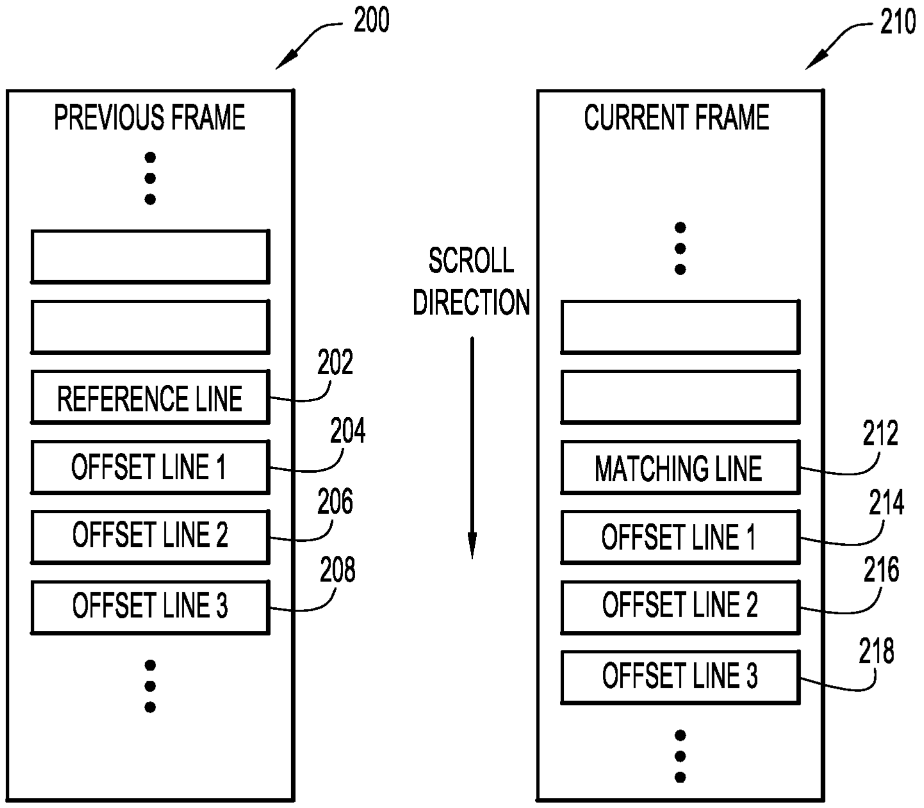
FIG. 5 is an example embodiment showing two frames of desktop sharing content in which the content includes vertical scrolling of a document.

Upon a determination that the detected scrolling area is adequate, a search is conducted for a reference line within the scrolling area of a previous (e.g., N−1) frame at 115. A reference line is a horizontal section within the current frame (e.g., a horizontal line of text within a text document) that is defined by one or more sets of pixel blocks, where each set has the same vertical coordinate value and changing horizontal coordinate values (e.g., a series of pixel blocks having coordinates (x, y), (x+1, y), (x+2, y), etc.) within the frame. An example embodiment of content being shared, such as a text document or any other type of scrolling document, is depicted in FIG. 5, in which a previous frame 200 including lines of pixel blocks is compared with a current frame 210 also including lines of pixel blocks that are shifted due to the vertical scrolling (as indicated by the arrow shown in FIG. 5).

Any criteria may be used to select a particular reference line within the scrolling area of the previous frame. In an example embodiment, a reference line is selected that has rich and/or sufficient color content information in order to improve accuracy (e.g., to prevent potential matching with similar but not identical lines in the current document) and to save time on later line searches. In this example embodiment, a reference line can be selected that includes pixels having a predetermined threshold of a minimum number of different colors or color transitions (e.g., 3 or more different colors or color transitions) as defined by the luminance component of the pixel blocks, and in which the number of color transitions between pixels within the line is greater than a predetermined value (e.g., a value of 3). So, for example, in a sample line having pixels in which the luminance values of the pixels are as follows: "1 1 1 2 2 2 3 3 3 4 4 4 . . . ", there are at least 3 color transitions (i.e., 1→2, 2→3, 3→4) between neighboring or adjacent pixels within the line of pixel blocks, so this sample line may be considered a suitable reference line (since the content has a significant transition in luminance/color values so as to be considered unique enough to be designated a reference line). If it is determined at 120 that no suitable reference line in the entire scrolling area can be found, the scrolling detection ends.

Upon finding a suitable reference line in the previous frame, a search is conducted at 125 for a matching line in the scrolling area of the current frame. This occurs by finding one or more sets of horizontally aligned pixels having the same values as the pixels of the reference line. The search can start at the same location in the current frame as the reference line for the previous frame, and then searching in vertical up and/or down directions from this location within the scrolling area. Since there should not be a large vertical deviation of a scrolling line between the reference frame and the current frame (particularly if the two frames are consecutive, i.e., frame N and frame N−1), a matching line should be found relatively quickly in either vertical direction depending upon the scrolling direction.

In an example embodiment, searching can occur simultaneously or at about the same time in both vertical directions from the starting location within the scrolling area of the current frame. The searching proceeds until a matching line has been found either above the starting location (indicating an upward vertical scroll from previous frame to current frame) or below the starting location (indicating a downward vertical scroll from previous frame to current frame).

Alternatively, a search can be conducted in one direction first (e.g., an upward vertical direction from the reference line location within the current frame). If, after a certain number of lines are searched in the first vertical direction, no matching line has been found, searching can be switched to the other direction (e.g., searching can be switched to a vertical direction below the location of the reference line location within the current frame). A default direction (up or down) can be selected for the matching line detection that is in the same direction as a matching line detection for a previous frame (e.g., based upon an assumption that the scrolling is in the same direction as detected for a previous frame).

If a matching line cannot be found at 130, the scrolling detection method ends. Alternatively, if at least one matching line is found, further verification occurs at 135 to ensure the matching line truly corresponds with the reference line of the reference frame. This is because it is possible for more than one matching line in a scrolling area to be initially identified, such that verification is necessary to determine whether an identified matching line actually corresponds with the reference line. The matching line verification occurs at 135 by comparing one or more lines that are adjacent (i.e., on one or both sides of) the matching line in the scrolling area. Any selected number of lines in the scrolling area can be searched and compared with corresponding lines in the previous frame to confirm that all neighboring lines vertically offset from the matching line that is being verified match with corresponding lines that are offset the same distance from the reference line of the previous frame.

In an example embodiment, at least 10 lines offset from an identified matching line in the scrolling area of the current frame are searched and verified as corresponding with lines offset from the reference line in the previous frame. In another embodiment, all lines in the scrolling area are verified as corresponding with lines in the previous frame. In all scenarios, verification of the other lines can be achieved quickly by comparing each line having a vertical offset from the identified matching line of the current frame with a corresponding line having the same vertical offset from the reference line of the previous frame.

Referring to the example embodiment showing two frames of content in FIG. 5, a matching line 212 of the current frame 210 is found that matches the reference line 202 of the previous frame 200, and then neighboring lines that are vertically offset from the matching line 212 (e.g., offset lines 214, 216, 218, etc.) are compared with corresponding neighboring lines of the previous frame 200 (e.g., offset lines 204, 206, 208, etc.) that are offset the same distance and in the same direction (e.g., offset line 214 is vertically offset the same distance from the matching line 212 as offset line 204 is vertically offset from the reference line 202, where both lines 214, 204 are offset in the same vertical direction from their respective matching/reference line) to verify that the matching line 212 corresponds with the reference line 202.

During verification at 135, if any line offset from the identified matching line of the current frame is not verified as matching a corresponding line having the same offset from the reference line in the previous frame, another (i.e., the next) matching line is searched for within the scrolling area at 125 from the current frame that matches the reference line. The process is then repeated to verify other lines offset from the next matching line match with corresponding lines offset from the reference line of the previous frame. If no matching line can be found with the selected number of offset lines matching corresponding offset lines from the reference line of the previous frame, the scrolling detection method ends (e.g., it is determined that no scrolling has been detected). Alternatively, if the selected number of offset lines from a matching line of the current frame match the corresponding offset lines from the reference line of the previous frame, a successful scrolling detection of the current frame has been achieved.

At 140, the scrolling detection, including information relating to the matching of lines of the current frame with the previous frame in the scrolling area, is output for use by the codec module 16 for encoding the current frame. In particular, the codec module 16 can utilize the successful scrolling detection information to determine the differences between the current frame and the reference frame in order to minimize redundancies in encoding pixel blocks within the current frame as well as subsequent frames associated with scrolling desktop content.

At 145, a determination is made whether to analyze another (e.g., the next consecutive) frame utilizing the scrolling detection algorithm. If the decision is made to analyze another frame, the process is repeated starting again at 100.

The scrolling detection process is advantageous, particularly for screen content sharing applications such as desktop sharing applications, since the detection of vertical scrolling can avoid the requirement for repeated scene detection. In typical encoding techniques for screen content sharing applications, scene detection is determined by comparing two consecutive frames to search for pixel changes. However, the search for scene detection uses an exhaustive review of the entire frame, pixel by pixel, and this process is also repeated for every incoming frame. In the scrolling detection described above, only a scrolling area need be defined and verified. In addition, by identifying a reference line in a previous frame and finding a matching line in a current frame (with corresponding matching of a selected number of offset lines from the matching and reference lines in each of the current and previous frames), a scene detection process involving a more exhaustive review of the frame pixels is not needed. The identified reference line can further be used in subsequent frames during scrolling detection to indicate scene changes.

In addition, motion estimation during the coding process can be enhanced using the screen scrolling information obtained by the scrolling detection process. When scrolling of screen content has been identified and verified, this can be used in motion estimation and provide accurate motion information. This also can reduce the overall encoding complexity.

The scrolling detection can be implemented with any types of content that is vertically scrolled within the screen content sharing area that is captured for sharing during a collaboration session including, without limitation, word processing documents, PDF documents, spreadsheet documents, multimedia (e.g., PPT) documents, etc. For text based files, in which lines of text in a document are being scrolled, the reference line, matching line(s) and other lines that are searched and verified can be the lines of text that are scrolled within the document. For other scrolling documents, a reference line and corresponding matching line and other lines can be defined by any set of pixel blocks aligned in a horizontal arrangement and at the same vertical location within a frame being analyzed.

A scrolling detection process was performed in accordance with the previously described techniques for different sample sequences of screen content to be shared by a computing device. Each sequence included scrolling of screen content throughout the sequence. The following Table 1 provides the performance results of the scrolling detection methods with these sequences.

TABLE 1

Scrolling Detection Performance for Different Sample Sequences

| Sequences | Number of Frames in Sequence | Correct detection | | Missed detection | | Detect speed (ms per frame) |
|---|---|---|---|---|---|---|
| Web_twoScreen_1920×1080 | 250 | 245 | 98% | 5 | 2% | 0.03864 |
| PDF_standard_1024×768 | 700 | 700 | 100% | 0 | 0 | 0.0069 |
| Doc_simple_1024×768 | 450 | 450 | 100% | 0 | 0 | 0.0057 |
| Doc_complex_1920×1080 | 250 | 247 | 98.8% | 3 | 1.2% | 0.03176 |
| Scene_action_1024×768 | 350 | 350 | 100% | 0 | 0 | 0.011 |
| PPT_simpleBig_1920×1080 | 250 | 250 | 100% | 0 | 0 | 0.0046 |
| PPT_simpleSmall_1024×768 | 349 | 349 | 99.7% | 1 | 0.3% | 0.0025 |
| PPT_BJUT_1280×720 | 250 | 250 | 100% | 0 | 0 | 0.02668 |
| Average | | | 99.56% | | 0.44% | 0.016 |

The different types of sequences are listed in the first column of Table 1. As can be seen from the results, almost no incorrect detection occurred (with 99.56% as the average correct detection for the tested sequences). In addition, the number of missed detections was minor for those sequences in which 100% correct detection did not occur (0.44% miss detection). And the speed of detection was fast given the high successful detection rate (0.016 ms to detect one frame).

The data in Table 2 provides performance information when applying the scrolling detection method to a screen content video coding technique, such as Sum of Absolute Different (SAD)-based reference management strategies. In this table, the term "SAD-based" refers to a SAD-based reference management strategy without period LTR, and "SAD-scroll-based" refers to a SAD and scroll motion information base reference management strategy without period LTR utilizing the scroll detection techniques described herein.

TABLE 2

Performance of SAD-based/SAD-scroll-based with no period LTR

| | | SAD-scroll-based vs SAD-based | | |
|---|---|---|---|---|
| Size | Sequences | BD_PSNR (dB) | BD_BR (%) | FPS Division |
| 1024 × 768 | Doc_simple | 0.008 | −0.030 | 1.065 |
| | PDF_standard | 0.000 | 0.001 | 1.054 |
| | Scene_action | 0.000 | 0.001 | 1.000 |
| 1280 × 720 | Doc_BJUT | 0.358 | −2.138 | 1.013 |
| | PPT_BJUT | 0.000 | 0.000 | 1.002 |
| | Web_BJUT | 2.258 | −12.853 | 1.044 |
| 1920 × 1080 | Doc_complex | 0.720 | −4.899 | 1.040 |
| | Web_twoScreen | 0.009 | −0.055 | 1.056 |
| Average | | 0.419 | −2.497 | 1.034 |

In Table 2, the BD_PSNR, BD_BR and FPS columns refer to three standard video coding performance indices, where PSNR refers to video quality improvement (where a greater value indicates a greater video quality improvement), BD-BR refers to bit-rate savings (where a smaller/more negative value refers to a better savings), and FPS refers to coding speed (where a larger value indicates greater coding speed). From Table 2, the screen content video coding efficiency is obviously improved when adding scrolling detection (i.e., better quality, greater bitrate savings, and faster coding speed). As indicated by the data of Table 2, the coding gain (BD-bitrates savings) of the proposed SAD-scroll-based method is between 0 to 13%, while the coding speed increases by 3.4%.

Thus, scrolling detection during sharing of desktop content as described herein enhances the overall screen encoding efficiency with reduced computational complexity in both scene detection and motion detection.

The above description is intended by way of example only.

What is claimed is:

1. A method comprising:

detecting a scrolling area within digital content comprising a plurality of frames, wherein the detection includes a comparison between a current frame and a previous frame to determine at least one location within the current frame in which pixel values change in relation to a corresponding location of the previous frame;

searching for a reference line of pixels within the scrolling area of the previous frame;

in response to finding the reference line, searching for a corresponding matching line of pixels in the current frame that matches the reference line;

in response to finding the corresponding matching line of pixels in the current frame, determining a degree of scrolling of content in the scrolling area of the current frame in relation to the previous frame, the degree of scrolling comprising information relating to a change in location of the matching line of the current frame in relation to the reference line of the previous frame; and verifying the degree of scrolling by comparing at least one line of pixels in the current frame that is offset a distance from the matching line of the current frame with a line of pixels in the previous frame that is offset the same distance from the reference line of the previous frame.

2. The method of claim 1, further comprising:

establishing a collaboration session between a first computing device and a second computing device, wherein the first computing device shares the digital content with the second computing device.

3. The method of claim 2, further comprising:

encoding the digital content based upon the degree of scrolling information.

4. The method of claim 1, further comprising:

in response to at least one line of pixels in the current frame that is offset a distance from the matching line of the current frame not matching a line of pixels in the previous frame that is offset the same distance from the reference line of the previous frame, searching for another corresponding matching line of pixels in the current frame that matches the reference line.

5. The method of claim 1, wherein the reference line includes a predetermined number of color transitions between adjacent pixels within the reference line.

6. The method of claim 1, wherein the content comprises a text document including scrolling lines of text, and the reference and matching lines each comprise a line of text.

7. An apparatus comprising:

a memory configured to store instructions including a scroll detection application; and a processor configured to execute and control operations of the scroll detection application so as to:

detect a scrolling area within digital content comprising a plurality of frames, wherein the detection includes a comparison between a current frame and a previous frame to determine at least one location within the current frame in which pixel values change in relation to a corresponding location of the previous frame;

search for a reference line of pixels within the scrolling area of the previous frame;

in response to finding the reference line, search for a corresponding matching line of pixels in the current frame that matches the reference line;

in response to finding the corresponding matching line of pixels in the current frame, determine a degree of scrolling of content in the scrolling area of the current frame in relation to the previous frame, the degree of scrolling comprising information relating to a change in location of the matching line of the current frame in relation to the reference line of the previous frame; and verify the degree of scrolling by comparing at least one line of pixels in the current frame that is offset a distance from the matching line of the current frame with a line of pixels in the previous frame that is offset the same distance from the reference line of the previous frame.

8. The apparatus of claim 7, further comprising:

an interface unit configured to establish a collaboration session between the apparatus and a computing device, wherein the apparatus shares the digital content with the computing device.

9. The apparatus of claim 7, wherein the processor is further configured to encode the digital content based upon the degree of scrolling information.

10. The apparatus of claim 7, wherein the processor is further configured to, in response to at least one line of pixels in the current frame that is offset a distance from the matching line of the current frame not matching a line of pixels in the previous frame that is offset the same distance from the reference line of the previous frame, search for another corresponding matching line of pixels in the current frame that matches the reference line.

11. The apparatus of claim 7, wherein the processor is further configured to find the reference line that includes a predetermined number of color transitions between adjacent pixels within the reference line.

12. The apparatus of claim 7, wherein the processor is further configured to analyze content via the scroll detection application that comprises a text document including scrolling lines of text, and the reference and matching lines each comprise a line of text.

13. One or more computer readable storage devices encoded with software comprising computer executable instructions and when the software is executed operable to:

detect a scrolling area within digital content comprising a plurality of frames, wherein the detection includes a comparison between a current frame and a previous frame to determine at least one location within the current frame in which pixel values change in relation to a corresponding location of the previous frame;

search for a reference line of pixels within the scrolling area of the previous frame;

in response to finding the reference line, searching for a corresponding matching line of pixels in the current frame that matches the reference line;

in response to finding the corresponding matching line of pixels in the current frame, determine a degree of scrolling of content in the scrolling area of the current frame in relation to the previous frame, the degree of scrolling comprising information relating to a change in location of the matching line of the current frame in relation to the reference line of the previous frame; and verify the degree of scrolling by comparing at least one line of pixels in the current frame that is offset a distance from the matching line of the current frame with a line of pixels in the previous frame that is offset the same distance from the reference line of the previous frame.

14. The one or more computer readable storage devices of claim 13, and further comprising instructions that are operable to establish a collaboration session between a first computing device and a second computing device, wherein the first computing device shares the digital content with the second computing device.

15. The one or more computer readable storage devices of claim 13, and further comprising instructions that are operable to encode the digital content based upon the degree of scrolling information.

16. The one or more computer readable storage devices of claim 13, and further comprising instructions that, in response to at least one line of pixels in the current frame that is offset a distance from the matching line of the current frame not matching a line of pixels in the previous frame that is offset the same distance from the reference line of the previous frame, are operable to search for another corresponding matching line of pixels in the current frame that matches the reference line.

17. The one or more computer readable storage devices of claim 13, wherein the reference line includes a predetermined number of color transitions between adjacent pixels within the reference line.

18. The one or more computer readable storage devices of claim 13, wherein the content comprises a text document including scrolling lines of text, and the reference and matching lines each comprise a line of text.

* * * * *